May 4, 1965 L. E. ANDERSON, SR 3,182,179
METHOD OF MAKING A WELDED JOINT
Filed May 18, 1964
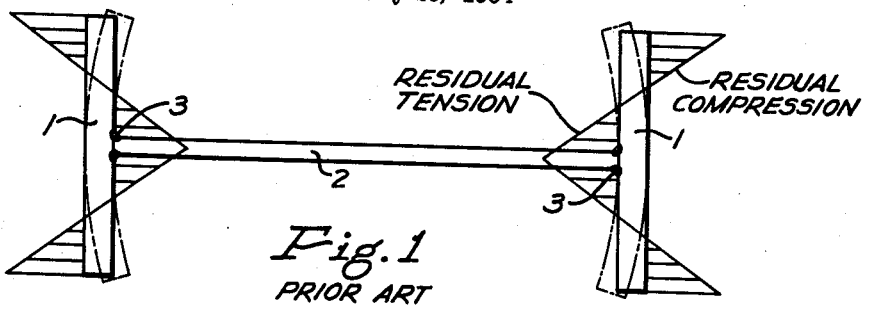
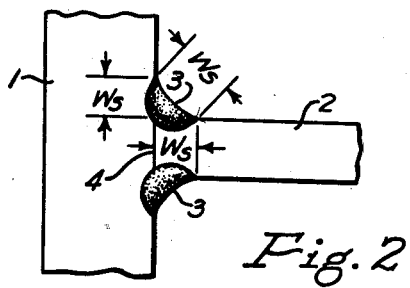
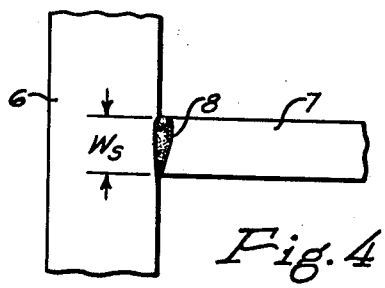
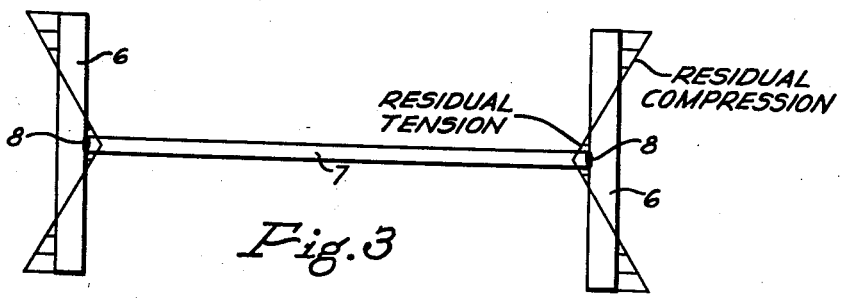
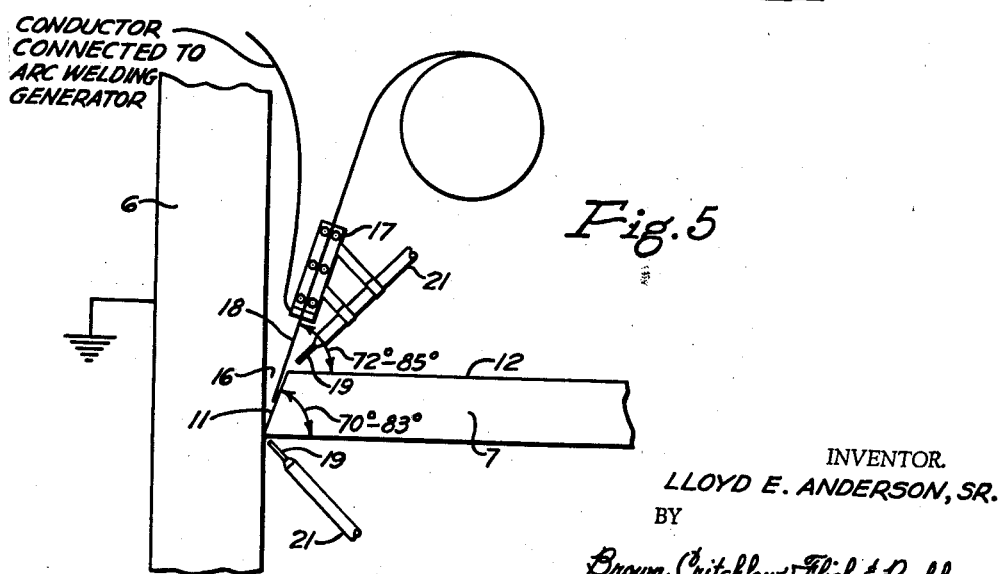
INVENTOR.
LLOYD E. ANDERSON, SR.
BY
Brown, Critchlow, Flick & Peckham.
ATTORNEYS.

United States Patent Office 3,182,179
Patented May 4, 1965

3,182,179
METHOD OF MAKING A WELDED JOINT
Lloyd E. Anderson, Sr., Pittsburgh, Pa., assignor to Pittsburgh-Des Moines Steel Company, Pittsburgh, Pa., a corporation of Pennsylvania
Filed May 18, 1964, Ser. No. 368,219
3 Claims. (Cl. 219—137)

This invention relates broadly to improvements in the method of making welded joints and, more particularly, to making a welded joint between the edge of one steel plate and the face of a second steel plate, as, for example, in making an I-beam by welding a web plate between two flange plates.

In making such an I-beam by conventional welding methods, the opposite edges of the web plate are welded to the faces of adjacent flange plates by fillet welds on each side of the web plate. These fillet welds produce severe residual stresses in the plates; and, since these structural shapes are generally weakest in compression, the residual compression stresses that are set up may severely limit the ultimate load bearing capacity of girders and columns made from such shapes. In addition, the residual stresses cause distortions in the beam that are not only unsightly, but also further weaken it. To avoid such distortions, the flanges are not infrequently deformed initially in a way that will permit the welding stresses to correct the initial deformation; but this is, at best, an expensive expedient.

It is accordingly a primary object of this invention to provide a method of welding the edge of one plate to the side or face of an adjacent plate, where the two plates are substantially at right angles to each other, in which the plates are subjected to a minimum of internal residual stresses by the welding operation and in which the weld itself, as well as the resulting structure, will have improved strength.

The foregoing and other objects of this invention will be apparent from the following description of a preferred embodiment in connection with the attached drawings, in which FIG. 1, labelled as "prior art," shows a typical section of an I-beam of welded construction, which was made in accordance with conventional methods of welding, and also indicates diagrammatically the approximate magnitude and location of the residual stresses resulting from the welding operation;

FIG. 2, also labelled as "prior art," is an enlarged portion of the beam in FIG. 1, showing the fillet welds in more detail;

FIG. 3 is a section of a welded I-beam made in accordance with the present invention and also indicates the approximate magnitude and location of the residual stresses resulting from the welding operation;

FIG. 4 is an enlarged section of a portion of the I-beam in FIG. 3; and

FIG. 5 is a similar section, prior to the actual welding operation, showing the bevel that is formed on an edge of the web plate preparatory to the welding operation, and the disposition of the plates and of the welding rod during the welding operation.

The present invention is predicated in part on the discovery that residual stresses and the resulting distortions in a welded T-joint are proportional to the amount of heat applied during the welding operation, and therefore proportional to the size of the weld nugget; and that they also vary in accordance with the geometry or shape of the nugget, which consists of the filler metal supplied by the welding rod and the melted parent metal of the plates being welded. The present invention involves the application of these principles to a welded T-joint between two plates, in which the junction is composed entirely of weld metal. The method of reaching this result includes forming a bevel on the edge of the first plate, the bevel extending across substantially the entire width of that edge and along so much of its length that is to be welded to the other plate. The bevel forms an included angle of from 70 to 83 degrees with the adjacent side face of the first plate. The two plates are then supported with the bevel of the first plate resting against the side face of the second plate, while maintaining the plates substantially at right angles to each other. When so positioned, there will be a deep, roughly V-shaped space or groove between the bevel of the first plate and the adjacent face of the second plate. The plates are then welded together by the local application of heat in the presence of a metal welding rod that is held at an angle of from 72 to 85 degrees to the adjacent side face of the first plate, with one end of the rod received in the groove between the two plates. This heat is applied also in the presence of an inert gas that protects the molten metal from oxidation and so permits the weld to penetrate effectively the full depth of the space or groove between the plates.

Referring to the drawings, in FIGS. 1 and 2 are shown conventional welded joints of the prior art, as used in fabricating a typical I-beam from flange plates 1 and a web plate 2. The edges of the latter, adjacent the flange plates, are flat and are initially in full abutting contact with the side faces of the flange plates. During the welding process, fillets 3 of weld metal are deposited along the intersections of the side faces of the web and flange plates. Since there is only limited penetration of the weld into the adjacent plates, the central portions 4 of the edges of the web plate still abut the side faces of the flange plates after the welding is completed. When the weld fillets cool, there will be shrinkage along each face of the weld nugget, as indicated in FIG. 2 by the symbol $W_s$. Although this shrinkage occurs in all directions, it is the geometry of the weld nugget (here roughly triangular) that governs the direction of forces that impart residual stresses to the adjacent plates and cause deformation of those plates. As shown in FIG. 1, these stresses tend to put the central portion of the flange under tension, and the outer portions of the flange under compression. Under certain conditions, these compressive stresses may approach the yield stress of the material and thereby limit the load carrying capacity of the structure. In addition, the shrinkage forces tend to deform the beam flanges, as shown by broken lines in FIG. 1 (these lines being exaggerated to make the deformation clearer). In addition, if the weld nuggets are not the same on each side of the web plate, the shrinkage forces on each side will be unequal and this may cause twisting of the beam that will further reduce its load carrying capacity. Because there is also shrinkage of weld metal in a longitudinal direction along the length of the weld, still other residual stresses are set up in the welded beam that may further limit its load carrying capacity. This limitation of load capacity in welded girders and columns, due to residual stresses induced by conventional welding methods, is a matter of increasing concern to structural designers. For example, it is generally recognized that high strength steel would be more commonly used in welded structural members, since it permits a theoretical reduction of thickness, except for the residual stresses, particularly compressive stresses, that are set up in welding the material and that tend to limit its ultimate load bearing capacity.

FIGS. 3 and 4 show another I-beam composed of flange plates 6 and a web plate 7, welded together in accordance with the process of this invention. It will be noted that the weld nugget 8 extends entirely across the thickness of the web plate and constitutes the junction between the plates. The shrinkage forces and residual stresses in this beam are obviously less than in the prior art beam of FIGS. 1 and 2.

FIG. 5 illustrates the steps to be followed in practicing this invention, including preparing the plates for welding, and also the proper positioning of the plates and the welding rod during the welding operation. The first step is to bevel the opposite edges 11 of web plate 7, the bevels extending lengthwise along the edges of the web plate a distance that is coextensive with the desired length of the weld, which is usually the entire length of the plate. The angle of bevel should be between 7 and 20 degrees from the plane of the normal squared edge of the plate; or, measured another way, the included acute angle between the bevel face 11 (or an extension of that face) and the adjacent side face 12 of the web plate should be from 70 to 83 degrees. In most situations, the preferred angle of bevel will be such an included angle of about 80 degrees. Within the ranges specified, this included angle should be decreased as the thickness of the flange plates increases relative to the thickness of the web plate. The bevelled faces on the web plate may be produced in any conventional way, as, for example, by machining the edges of the plate.

The next step after the formation of the bevels on the web plate is to support the web and flange plates by suitable means (not shown), so as to maintain them in the relative positions shown in FIG. 5, in which the flange plate is at right angles to the web plate and the outer edge of the bevel rests against the face of the adjacent plate. When so supported, the face of the bevel and the adjacent face of the flange plate will form a deep V-shaped groove or space 16 between the two plates. The plates are then welded, by the use of plasma jet, metal inert gas, electron beam, electric arc, or any similar welding process that will develop deep narrow penetrations in the metal being welded. The apparatus shown in FIG. 5 includes portions of conventional arc welding equipment, including a holder 17 for feeding a welding rod or wire 18 to the joint, and also nozzles 19 and hose lines 21 connected to an inert gas supply (not shown). For the successful practice of this invention, it is essential that the welding rod or wire be supported with one end in the V-shaped groove 16 and with the rod inclined at an angle from 72 to 85 degrees from the adjacent side face of the web plate, this angle being least when the included bevel angle is greatest. The rod is, of course, moved lengthwise of the V-shaped groove as the welding progresses along the length of the joint. The angle of feed of the filler material here represented by the welding rod or wire in relation to the angle of the groove between the plates is a critical feature of this invention, since it controls the direction of the arc. A further critical feature is the use of an inert gas, such as carbon dioxide, to blanket the joint during the welding operation, thereby to protect the molten metal from oxidation and permit effective penetration of the weld for the full depth of the groove between the plates.

When a welded joint is made in accordance with the steps herein described, the weld penetrates the full depth of the V-shaped groove, as shown by the shaded area of the weld nugget in FIG. 4. One of the advantages of initially providing this groove is that the surfaces incorporated in the weld nugget are fully exposed to the welding heat, to the deposition of filler metal, and to the blanket of inert gas. As a result, it is possible to increase the linear speed of the welding operation, thereby putting less heat into the plates to be welded with a consequent reduction in the residual stresses and in the deformation imparted to those plates. In addition, the weld nugget is relatively thin and the shrinkage forces that it exerts in cooling are, as shown in FIG. 4, substantially limited to a single plane. This results in a very strong joint and one that subjects the adjacent metal plates to a minimum of undesirable residual stresses.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. The method of welding the edge of a first steel plate to the side face of a second steel plate with the two plates substantially at right angles to each other, said method including the following steps: forming a bevel extending across substantially the entire width of the edge of the first plate and along so much of its length that is to be welded, said bevel forming an included angle of from 70 to 83 degrees with an adjacent side face of the first plate, supporting the plates with an edge of the bevel of the first plate resting against the face of the second plate while maintaining the plates substantially at right angles to each other, thereby to provide a grooved space defined by said bevel and face, welding the plates together by the local application of heat while supplying filler material to the weld from a metal welding rod that has one end received in the grooved space and is fed therein at an angle of from 72 to 85 degrees to the adjacent side face of the first plate, the heat being applied in the presence of an inert gas so as to penetrate and melt the metal on each side of said space, thereby to limit the connection between the first and second plates in the welded zone to a relatively thin junction of weld metal.

2. The method according to claim 1, in which the bevel forms an included angle of around 80 degrees with an adjacent side face of the first plate and in which the welding rod is fed at an angle of about 83 degrees to the same face.

3. The method according to claim 1, in which the bevel is substantially flat and forms a narrow V-shaped groove with the adjacent face of the second plate.

References Cited by the Examiner

FOREIGN PATENTS 528,980   3/40   Great Britain.

RICHARD M. WOOD, *Primary Examiner.*

ANTHONY BARTIS, *Examiner.*